United States Patent
Rabasco et al.

(10) Patent No.: US 6,395,817 B2
(45) Date of Patent: *May 28, 2002

(54) POLY(VINYL ALCOHOL)-G-POLYETHYLENE GRAFT EMULSION COPOLYMERS

(75) Inventors: John Joseph Rabasco; William Edward Lenney, both of Allentown, PA (US)

(73) Assignee: Air Products Polymers, L.P., Allentown, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,511

(22) Filed: Mar. 15, 2000

(51) Int. Cl.$^7$ .......................... C08F 2/16; C08F 261/04; C08L 29/04
(52) U.S. Cl. .......................... 524/459; 524/803; 525/59
(58) Field of Search .................. 525/59, 296, 303, 525/309, 311, 319; 524/459, 803

(56) References Cited

U.S. PATENT DOCUMENTS

| | | | |
|---|---|---|---|
| 3,926,934 A | | 12/1975 | Lasswell et al. ......... 260/94.9 A |
| 4,118,357 A | * | 10/1978 | Brabetz et al. ............. 524/503 |
| 4,575,532 A | | 3/1986 | Schmukler et al. ........... 525/57 |
| 4,605,589 A | * | 8/1986 | Orphanides ................ 442/102 |
| 4,937,284 A | | 6/1990 | Bergstrom ................... 525/57 |
| 5,296,532 A | * | 3/1994 | Haerzschel et al. ......... 524/398 |
| 5,599,870 A | * | 2/1997 | Nakamae et al. ........... 524/503 |
| 5,814,374 A | * | 9/1998 | Nkansah et al. ............. 427/386 |
| 5,872,181 A | * | 2/1999 | Daniels et al. .............. 524/563 |

FOREIGN PATENT DOCUMENTS

| | | |
|---|---|---|
| JP | 5173033 | 6/1976 |
| JP | 6445876 | 2/1989 |
| JP | 11152316 | 6/1999 |

OTHER PUBLICATIONS

Odian, George, Principles of Polymerization 3rd Ed., John Wiley and Sons, New York (pp. 715–716 and 719), 1991.*
*Polyvinyl Alcohol—Developments,* edited by C. A. Finch, Wiley, 1992, pp. 449–453.
*Polyvinyl Alcohol,* edited by C. A. Finch, Wiley, 1973, pp. 438–442.
JP 58040323 (abstract), SciFinder, Oct. 7, 1999, page 2.
Watanabe, T., et al. (*Polym. Prepr.,* 34(1), 1993, pp. 912–913) (abstract).

* cited by examiner

Primary Examiner—Vasu Jagannathan
Assistant Examiner—Callie E. Shasho
(74) *Attorney, Agent, or Firm*—Mary E. Bongiorno

(57) ABSTRACT

Aqueous based graft emulsion copolymers comprising a polymer having a plurality of hydroxyl groups, preferably a vinyl alcohol homo- or copolymer, grafted with a polyethylene. The graft emulsion copolymer can be prepared by polymerizing ethylene and, optionally another ethylenically unsaturated monomer, in an aqueous solution of a polymer having a plurality of pendent hydroxyl groups, especially poly(vinyl alcohol). The graft emulsion copolymer product can have a polyethylene content ranging from 50 to 95 wt %, hydroxyl-containing polymer ranging from 5 to 50 wt %, and up to 45 wt % of another polymerized ethylenically unsaturated monomer. Polymerization is carried out in an aqueous solution containing at least 5 wt %, preferably 10 wt %, of a hydroxyl-containing polymer having a degree of polymerization of 50 to 2200, preferably 100 to 500.

17 Claims, No Drawings

POLY(VINYL ALCOHOL)-G-POLYETHYLENE GRAFT EMULSION COPOLYMERS

BACKGROUND OF THE INVENTION

Poly(vinyl alcohol) has very low gas permeability making it especially useful as a gas barrier material. However, due in part to its high polarity, its melting point is close to its decomposition temperature which can be problematic in coating applications. In addition, poly(vinyl alcohol) polymers absorb moisture. One approach to alleviate these problems has been to introduce hydrocarbon units into the chain of the poly(vinyl alcohol) polymer to form copolymers.

Graft copolymerization of poly(vinyl alcohol) is a known method of changing the composition of poly(vinyl alcohol) in order to change the properties. For example *Polyvinyl Alcohol-Developments*, edited by C. A. Finch, Wiley, 1992, pages 449–453 contains information on the graft polymerization of vinyl acetate with poly(vinyl alcohol). *Polyvinyl Alcohol*, edited by C. A. Finch, Wiley, 1973, pages 438–442, reviews the use of ceric complexes in forming grafted copolymers of poly(vinyl aclohol) and several ethylenically unsaturated monomers, such as, methyl acrylate, methyl methacrylate, acrylonitrile, acrylamide, and styrene.

Little is known about the polymerization, especially graft polymerization, of alkenes, and specifically ethylene, in a poly(vinyl alcohol) solution.

U.S. Pat. No. 3,926,934 (Lasswell, et al., 1975) discloses the production of polyethylene powders by high pressure polymerization of ethylene employing a water-soluble initiator, a controlled concentration of water, a dispersing agent, such as polyvinyl alcohol, and rapidly venting the polymerization zone or the polymerization effluent mixture withdrawn from the polymerization zone.

JP 51-73033 (1976) discloses wood adhesives which contain ethylenically unsaturated compounds or conjugated dienes graft-polymerized with poly(vinyl alcohol). Examples of ethylenically unsaturated compounds include styrene, acrylic and methacrylic acid and esters, unsaturated amides such as methacrylamide, and olefins, such as isobutylene. Butadiene and isoprene are examples of conjugated dienes. It is reported that a hydrophilic grafted polymer is formed in which the monomers are 0.2 to 5 parts by weight, per part by weight of poly(vinyl alcohol).

JP 64-45876 (1989) discloses the manufacture of a spray sizing agent consisting of a graft copolymer of poly(vinyl aclohol) and α, β-monoethylenic monomers such that the ratio of poly(vinyl alcohol) to monomer is 100:5-100. Examples of α, β- monoethylenic monomers include acrylates, methacrylates, vinyl acetate, and vinyl versitate. Other unsaturated monomers which reportedly can be combined with the above α, β-monoethylenic monomers include styrene, acrylamide, vinyl chloride, and ethylene.

JP11-152316 (1999) discloses alkylated polyvinyl alcohol in which ethylene is added to the polyvinyl alcohol side chain. The addition reaction is carried out in an aqueous solution of poly(vinyl alcohol) at a pressure of 10 to 80 $kg/cm^2$ (1080 to 7948 kPa) using a radical initiator at levels of 0.1 to 100 wt %, preferably 1 to 50 wt %. In the examples, a 2.35 wt % aqueous solution of poly(vinyl alcohol) (PVA 217 and PVA 117; DPn=1700; hydrolysis of 88 mol % and 98 mol %, respectively; Kuraray Co.) was used to form alkylated polyvinyl alcohol. In the examples, the mean number of carbons in the grafted alkyl group was 12.6 to 13.8.

Poly(vinyl alcohol)-g-polyethylene copolymers have typically been made by grafting polyethylene to poly(vinyl alcohol). Examples of grafting methods are described below:

JP 58040323 (abstract) discloses the graft polymerization of poly(vinyl alcohol) onto HDPE films using γ irradiation.

U.S. Pat. No. 4,575,532 (Schmukler et al., 1986) discloses a polyvinyl alcohol alloy which is prepared by reacting polyvinyl alcohol with a polyolefin which incorporates functional groups reactive with the hydroxyl groups in polyvinyl alcohol. Examples of suitable polyolefins are polyethylene, ethylene copolymers, and polypropylene.

U.S. Pat. No. 4,937,284 (Bergström, 1990) discloses the manufacture of olefin/vinyl alcohol block copolymers by joining polyvinyl alcohol to a polyolefin, such as low density polyethylene, low pressure polyethylene, high density polyethylene, and polypropylene, with the aid of silane.

Watanabe, T., et. al. (*Polym. Prepr.*, 34(1), 1993, pp. 912–913) (abstract) discloses the graft modification of poly (vinyl alcohol) with succinic anhydride modified LDPE.

Poly(vinyl alcohol)-g-polyethylene graft emulsion copolymers in which ethylene is graft copolymerized to poly(vinyl alcohol) in an aqueous solution to form graft emulsion copolymers containing 50 wt % or more polyethylene have not been reported.

BRIEF SUMMARY OF THE INVENTION

This invention is directed to aqueous based grafted copolymers comprising a polymer having a plurality of hydroxyl groups, preferably a vinyl alcohol homo- or copolymer, grafted with polyethylene, and optionally another polymerized ethylenically unsaturated monomer. The graft emulsion copolymers can contain 50 to 95 wt % polyethylene, 5 to 50 wt % hydroxyl-containing polymer, and up to 45 wt % of another polymerized ethylenically unsaturated monomer. Some homo- or copolymers of ethylene can also be present in the graft emulsion copolymer product.

The graft emulsion copolymers are prepared by polymerizing ethylene and, optionally another ethylenically unsaturated monomer, in an aqueous solution containing at least 5 wt %, preferably at least 10 wt %, of a polymer having a plurality of pendent hydroxyl groups, preferably poly(vinyl alcohol). The poly(vinyl alcohol) can have a degree of polymerization (DPn) of 50 to 2200, preferably 100 to 1000; and most preferably 100 to 300. A high solids, i.e., 10 to 65 wt %, preferably 30 to 60 wt %, graft emulsion copolymer product is formed.

The graft emulsion copolymer of this invention can be useful for films and provide unique performance features in a variety of applications, such as temperature sensitive adhesives, paper coatings, nonwoven coatings, binders for nonwovens, gas barrier films, and emulsion polymerization applications. The addition of a polyethylene to poly(vinyl alcohol) results in improvement of the hydrophobic properties, enhancement of oxygen barrier properties, improvement of tensile, and improved ease of film formation.

DETAILED DESCRIPTION OF THE INVENTION

The graft emulsion copolymers of this invention can be prepared by free radical initiated polymerization of ethylene, and, optionally, another ethylenically unsaturated monomer, in a solution of at least 5 wt %, preferably at least 10 wt %, of a polymer containing a plurality of pendent hydroxyl groups. The hydroxyl-containing polymer is preferably poly(vinyl alcohol).

Examples of other ethylenically unsaturated monomers are straight chain or branched alkenes, such propylene, butylene, isobutylene, pentene, and the like, wherein the number of carbons in the alkene ranges from 3 to 12, vinyl acetate, vinyl versatate, or other vinyl esters, alkyl acrylates, alkyl methacrylates, hydroxyalkyl acrylates, hydroxyalkyl methacrylates, acrylamides, methacrylamides, N-methylolacrylamide, and combinations thereof; wherein alkyl is $C_1$ to $C_6$ alkyl.

Polymers having a plurality of pendent hydroxyl groups can be formed by the polymerization of vinyl or acrylic esters in which the ester unit contains from 1 to 4 carbon atoms. The pendent ester groups, when hydrolyzed, form polymers containing pendent hydroxyl groups. A preferred class of polymers having a plurality of pendent hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. The amount of vinyl alcohol should be sufficient to enable free radical graft polymerization in an aqueous solution; i.e., render the polymer at least partially soluble in an aqueous medium. Typically the vinyl ester, specifically vinyl acetate, will comprise from 60 to 100% of the copolymer, preferably at least 90 mol percent of the polymer. The poly(vinyl alcohol) used in this invention, generally, has a weight average molecular weight ($M_W$) ranging from about 4,000 to 186,000, preferably 8,000 to 40,000; and most preferably, 8,000 to 23,000. Alternatively, the poly(vinyl alcohol) can have a degree of polymerization (DPn) of from 50 to 2200, preferably 100 to 500; most preferably 100 to 300. Poly(vinyl alcohol) is made commercially by the hydrolysis of poly(vinyl acetate) and typically has a hydrolysis level ranging from about 85 to greater than 99 mol %. For this invention, the level of hydrolysis can range from 50 to 100 mol %, preferably 85 to 98 mol %, and most preferably 86 to 92 mol %. Mixed poly(vinyl alcohol) grades in which the poly(vinyl alcohol) varies in molecular weight and hydrolysis level, can also be employed in the present invention. It is desirable that a mixture contain predominantly low to ultra-low molecular weight poly(vinyl alcohol), in order to maximize the solids levels and produce a graft emulsion copolymer with a high amount of polyethylene. By using low molecular weight poly(vinyl alcohol), better coalescence, favorable solids-viscosity relationships, and high overal product solids can be achieved with the graft emulsion copolymer.

The free radical graft copolymerization reaction is conducted in an aqueous solution of the polymer having a plurality of pendent of hydroxyl groups, at a temperature necessary to liberate free radicals for the polymerization. Typical temperatures range from 30 to 95° C., preferably 40 and 90° C. Reaction times typically range from 1 to 10 hours.

Examples of free radical initiators which can be employed in the graft copolymerization reaction include ammonium persulfate, sodium persulfate, potassium persulfate, and others. Redox initiation systems can also be used. Suitable reducing agents or activators include bisulfites, sulfoxylates, ascorbic acid, erythorbic acid, and other reducing sugars. Suitable oxidants include tert-butylhydroperoxide, hydrogen peroxide, and the like. Persulfate initiator systems are preferred for the poly(vinyl alcohol) grafting reactions. The amount of initiator used can be about 0.1 to 30 wt %, preferably 1 to 20 wt %, based on the amount of vinyl alcohol polymer.

Pressure during the graft polymerization reaction can be greater than about 600 psi (4238 kPa) depending on the amount of ethylene which is desired in the graft emulsion copolymer. Pressures of 1200 psi (8375 kPa) or greater can be used when the amount of initiator is 2 to 5 wt %, based on the amount of poly(vinyl alcohol), in order to produce a graft emulsion copolymer containing at least 50 wt % polyethylene.

Well known polymerization methods can be used and the reaction can be carried out as a batch or continuous reaction. A method which has been found effective in producing the graft emulsion copolymers is to first prepare the aqueous solution of the hydroxyl-containing polymer and introduce it into a reactor which has been purged with an inert gas, such as nitrogen. The ethylene and, optionally, other monomer, can then be introduced under pressure and agitation, and the temperature increased to reaction temperature. Initiator and monomers are added incrementally over the reaction period, and the reaction mixture maintained at reaction temperature for a time required to produce the desired product.

It has been found that by using specific process conditions and reactants as discussed above, a high solids, i.e., 10 to 65 wt %, preferably 30 to 60 wt %, graft emulsion copolymer product can be formed.

The product of the graft polymerization contains poly(vinyl alcohol)-g-polyethylene as well as some homo- or copolymer of the ethylene and other monomers present in the reaction mixture. The graft emulsion copolymer contains 50 to 95 wt % polyalkylene, 5 to 50 wt % hydroxyl-containing polymer, and up to 45 wt %, preferably up to 25 wt %, of other ethylenically unsaturated monomers, based on the total weight of graft emulsion copolymer.

It has also been found that the crystalline melting point of the poly(vinyl alcohol) is significantly lowered by grafting polyethylene to it; for example, the crystalline melting point can be lowered to about 100° C. The melting point can be reduced further by copolymerizing other monomers with the ethylene.

The invention will be further clarified by a consideration of the following examples, which are intended to be purely exemplary of the invention.

Airvol®502 (DP~200, 88 mol % hydrolyzed) poly(vinyl alcohol) was used in all of the examples.

EXAMPLE 1

Preparation of Poly(vinyl alcohol)-g-Polyethylene Graft Copolymers

A 20.6% aqueous solution of Airvol 502 (1743 grams) was charged to a nitrogen purged 1-gallon stainless steel pressure reactor. With stirring at 100 rpm, the reactor was purged with nitrogen followed by purging with ethylene. The reactor was then heated to 70° C. and the agitation rate increased to 500 rpm. Subsequently, the reactor was pressurized to 1700 psi with ethylene followed by the addition of 20 grams initiator solution (5% aqueous sodium persulfate containing sodium bicarbonate buffer) to the reactor. A continuous feed of initiator solution at a rate ranging from 0.50–2.0 grams/minute was added to the reactor over an 8-hour period. Ethylene pressure was maintained at 1700 psi throughout the 8-hour reaction period. After discontinuing the initiator feed at the end of the 8-hour period, the reactor was stirred for another 30 minutes at 90° C. before cooling. The resulting poly(vinyl alcohol)-g-polyethylene graft copolymer emulsion had a total solids of 38.9%, which corresponds to a copolymer composition of approximately 70 wt % polyethylene and 30 wt % poly(vinyl alcohol). A broad DSC melt transition was observed centered at $T_m=102°$ C., and the Brookfield viscosity (100 rpm, 25° C.) was 80 centipoise.

EXAMPLE 2

Preparation of Poly(vinyl alcohol)-g-Polyethylene Graft Copolymers

A 20% aqueous solution of Airvol 502 (1575 grams) and water (990 grams) was charged to a nitrogen purged 1-gallon stainless steel pressure reactor. With stirring at 100 rpm, the reactor was purged with nitrogen followed by purging with ethylene. The reactor was then heated to 90° C. and the agitation rate increased to 500 rpm. Subsequently, the reactor was pressurized to 1900 psi with ethylene followed by the addition of initiator solution (5% aqueous sodium persulfate containing sodium bicarbonate buffer) at a rate of 0.60 grams/minutes. Ethylene pressure was maintained at 1900 psi throughout the 6-hour reaction period. After discontinuing the initiator feed at the end of the 6-hour period, the reactor was stirred for another 30 minutes at 90° C. before cooling. The resulting poly(vinyl alcohol)-g-polyethylene graft copolymer emulsion had a total solids of 24.6%, which corresponds to a copolymer composition of approximately 60 wt % polyethylene and 40 wt % poly(vinyl alcohol). A broad DSC melt transition was observed centered at $T_m=92°$ C., and the Brookfield viscosity (100 rpm, 25° C.) was 80 centipoise.

EXAMPLE 3

Failed Attempt to Prepare Poly(vinyl alcohol)-g-Polyethylene Graft Copolymers

A 20% aqueous solution of Airvol 502 (1800 grams) and 1% aqueous ferrous ammonium sulfate (6 grams) was charged to a nitrogen purged 1-gallon stainless steel pressure reactor. With stirring at 100 rpm, the reactor was purged with nitrogen followed by purging with ethylene. The reactor was then heated to 70° C. and the agitation rate increased to 500 rpm. Subsequently, the reactor was pressurized to 1700 psi with ethylene followed by the addition of 4% aqueous sodium formaldehyde sulfoxylate (10 grams). Separate redox initiator delay feeds of 4% aqueous sodium formaldehyde sulfoxylate (rate=0.50 grams/minute) and 1% hydrogen peroxide (0.50 grams/minute) were then started. The redox delay feeds were increased incrementally to 2.0 grams/minute during the 100 minute reaction period. No ethylene was consumed during this 100 minute reaction period, therefore, the experiment was stopped. These reaction conditions failed to produce a poly(vinyl alcohol)-g-polyethylene graft copolymer.

EXAMPLE 4

Failed Attempt to Prepare Poly(vinyl alcohol)-g-Polyethylene Graft Copolymers

A 20% aqueous solution of Airvol 502 (2000 grams) was charged to a nitrogen purged 1-gallon stainless steel pressure reactor. With stirring at 200 rpm, the reactor was purged with nitrogen followed by purging with ethylene. The reactor was then heated to 70° C. and the agitation rate increased to 800 rpm. Subsequently, the reactor was pressurized to 600 psi with ethylene followed by the addition of 80 grams initiator solution (5% aqueous sodium persulfate containing sodium bicarbonate buffer) to the reactor. A continuous feed of initiator solution at a rate ranging from 0.89 grams/minute was added to the reactor over a 4.75-hour period. Ethylene pressure was maintained at 600 psi throughout the reaction period. No ethylene was consumed during this 100 minute reaction period. The experiment was stopped. These reaction conditions failed to produce a poly(vinyl alcohol)-g-polyethylene graft copolymer.

EXAMPLE 5

Preparation of Poly(vinyl alcohol)-g-Polyethylene Graft Copolymers

A 20% aqueous solution of Airvol 502 (1800 grams) and 1% ferrous ammonium sulfate (6 grams) was charged to a nitrogen purged 1-gallon stainless steel pressure reactor. With stirring at 100 rpm, the reactor was purged with nitrogen followed by purging with ethylene. The reactor was then heated to 70° C. and the agitation rate increased to 800 rpm. Subsequently, the reactor was pressurized to 1700 psi with ethylene followed by the addition of 4% aqueous sodium formaldehyde sulfoxylate (10 grams) to the reactor. Separate redox initiator delay feeds of 4% aqueous sodium formaldehyde sulfoxylate (rate=0.50 grams/minute) and 2% t-butylhydrogen peroxide (0.50 grams/minute) were then started. Ethylene pressure was maintained at 1700 psi throughout the 6-hour reaction period. After discontinuing the initiator feeds at the end of the 6-hour period, the reactor was stirred for another 30 minutes at 70° C. before cooling. The resulting poly(vinyl alcohol)-g-polyethylene graft copolymer emulsion had a total solids of 29.0%, which corresponds to a copolymer composition of approximately 50 wt % polyethylene and 50 wt % poly(vinyl alcohol). A broad DSC melt transition was observed centered at $T_m=104°$ C. and the Brookfield viscosity (20 rpm, 25° C.) was 620 centipoise.

EXAMPLE 6

Preparation of Poly(vinyl alcohol)-g-Polyethylene-co-MAMD Graft Copolymers

A 20% aqueous solution of Airvol 502 (2000 grams) was charged to a nitrogen purged 1-gallon stainless steel pressure reactor. With stirring at 100 rpm, the reactor was purged with nitrogen followed by purging with ethylene. The reactor was then heated to 70° C. and the agitation rate increased to 800 rpm. Subsequently, the reactor was pressurized to 1800 psi with ethylene. A delay feed of 50% aqueous MAMD (mixture of N-methylol-acrylamide and acrylamide) was started at a rate of 0.32 grams/minute and 5% aqueous buffered sodium persulfate (80 grams) was added to the reactor. Addition of initiator solution was then continued at a rate of 0.67 grams/minute. A continuous feed of initiator solution was added to the reactor over a 6 hour period. Ethylene pressure was maintained at 1800 psi throughout the 6-hour reaction period, and the feed rate of MAMD was altered somewhat during the reaction period to maintain sufficient polymerization rates. After discontinuing the initiator feed at the end of the 6-hour period, the reactor was stirred for another 60 minutes at 70° C. before cooling. The resulting poly(vinyl alcohol)-g-polyethylene-co-MAMD graft copolymer emulsion had a total solids of 29.5%, which corresponds to a copolymer composition of approximately 46.4 wt % polyethylene, 3.2 wt % MAMD, and 50.4 wt % poly(vinyl alcohol). A broad DSC melt transition was observed centered at $T_m=99°$ C. and the Brookfield viscosity (20 rpm, 25° C.) was 685 centipoise.

EXAMPLE 7

Preparation of Poly(vinyl alcohol)-g-Polyethylene-co-Poly(vinyl acetate) Graft Copolymers A 20% aqueous solution of Airvol 502 (1800 grams) was charged to a nitrogen purged 1-gallon stainless steel pressure reactor. With stirring at 100 rpm, the reactor was purged with nitrogen followed by purging with ethylene. The reactor was then heated to 70° C. and the agitation rate increased to 500 rpm. Subsequently, the reactor was pressurized to 1700 psi with ethylene. Simultaneously, delay feeds of vinyl acetate at a rate of 0.10 grams/minutes (increased to 0.20 grams/minutes after a 30 minute reaction period) and 5% aqueous buffered sodium persulfate at a rate of 0.50 grams/minutes (increased to 1.0 grams/minute after a 30 minute reaction period) were started. Continuous feeds of initiator solution and monomer were added to the reactor over an 8-hour period. Ethylene pressure was maintained at 1700 psi throughout the 8 hour reaction period. After discontinuing the initiator feed at the end of the 8-hour period, the reactor was stirred for another 30 minutes at 90° C. before cooling. The resulting poly(vinyl alcohol)-g-polyethylene-co-poly(vinyl acetate) graft copolymer emulsion had a total solids of 44.6%, which corresponds to a copolymer composition of approximately 50 wt % polyethylene, 15 wt % poly(vinyl acetate), and 35 wt % poly(vinyl alcohol). A broad DSC melt transition was observed centered at $T_m$=104.8° C., and the Brookfield viscosity (50 rpm, 25° C.) was 66,000 centipoise.

EXAMPLE 8

Preparation of Poly(vinyl alcohol)-g-Polyethylene Graft Copolymers

A 24.9% aqueous solution of Airvol 502 (803 grams) and water (1197 grams) was charged to a nitrogen purged 1-gallon stainless steel pressure reactor. With stirring at 200 rpm, the reactor was purged with nitrogen followed by purging with ethylene. The reactor was then heated to 75° C. and the agitation rate increased to 800 rpm. Subsequently, the reactor was pressurized to 1400 psi with ethylene followed by the addition of 100 grams of a 10 wt % aqueous buffered sodium persulfate solution. After the addition of the 100 grams of initiatior, additional initiator solution was delay fed into the reactor at a rate of 0.20 grams/minute. A continuous feed of initiator solution was added to the reactor over a 6.5-hour period; the feed rate was increased to 0.50 grams/minute after 100 minutes. Ethylene pressure was maintained at 1400 psi throughout the 6-hour reaction period. After discontinuing the initiator feed at the end of the 6.5-hour period, the reactor was stirred for another 30 minutes at 75° C. before cooling. The resulting poly(vinyl alcohol)-g-polyethylene graft copolymer emulsion had a total solids of 34 wt %, and infrared spectroscopy analysis indicated a copolymer composition of approximately 92 wt % polyethylene and 8 wt % poly(vinyl alcohol). The emulsion was stable having less than 1% accelerated sedimentation. A DSC melt transition was observed centered at $T_m$=95° C., and the Brookfield viscosity (20 rpm, 25° C.) was 3120 centipoise.

EXAMPLE 9

Poly(vinyl alcohol)-g-Polyethylene-co-Poly(VEOVA-10) Graft Copolymers

A 15% aqueous solution of Airvol 502 (1333 grams), vinyl versatate (VEOVA 10; 20 grams), and water (600 grams) was charged to a nitrogen purged 1-gallon stainless steel pressure reactor. With stirring at 200 rpm, the reactor was purged with nitrogen followed by purging with ethylene. The reactor was then heated to 75° C. and the agitation rate increased to 800 rpm. Subsequently, the reactor was pressurized to 1400 psi with ethylene followed by the addition of 100 grams of a 10 wt % aqueous buffered ammonium persulfate solution. After the addition of the 100 grams of initiatior, additional initiator solution was delay fed into the reactor at a rate of 0.49 grams/minute and a delay feed of VEOVA-10 (230 grams) was started at a rate of 0.59 grams/minute. A continuous feed of initiator solution was added to the reactor over a 6.8-hour period. After discontinuing the initiator feed at the end of the 6.8-hour period, the reactor was stirred for another 30 minutes at 75° C. before cooling. The resulting poly(vinyl alcohol)-g-polyethylene-co-poly(VEOVA-10) graft copolymer emulsion had a total solids of 36 wt %, and the polymer composition based on the final solids was approximately 54 wt % polyethylene, 26 wt % poly(VEOVA-10), and 20 wt % AIRVOL 502. The emulsion was stable having less than 0.5% accelerated sedimentation. A DSC melt transition was observed centered at $T_m$=80° C., and the Brookfield viscosity (20 rpm, 25° C.) was 254 centipoise The table below presents a summary of the reaction conditions and products of the examples.

| | | | | | Product | | |
|---|---|---|---|---|---|---|---|
| Ex | Airvol 502[a] | Monomer | Initiator | Reaction Type | % Solids | Viscosity cP | Tm ° C. | Content wt % |
| 1 | 1743/ 20.6% | Ethylene, 1700 psi | sodium persulfate | thermal, 70° C. | 38.9 | 80*** | 102 | 70% E/ 30% PVOH |
| 2 | 1575/ 20% | Ethylene, 1900 psi | sodium persulfate | thermal, 90° C. | 24.6 | 80*** | 92 | 60% E/ 40% PVOH |
| 3 | 1800/ 20% | Ethylene, 1700 psi | SFS + $H_2O_2$ | redox 70° C. | | no product | | |
| 4 | 2000/ 20% | Ethylene, 600 psi | sodium persulfate | thermal, 70° C. | | no product | | |
| 5 | 1800/ 20% | Ethylene, 1700 psi | SFS + tBHP | redox 70° C. | 29.0 | 620* | 104 | 50% E/ 50% PVOH |
| 6 | 2000/ 20% | Ethylene, 1800 psi; MAMD | sodium persulfate | thermal, 70° C. | 29.5 | 685* | 99 | 46.4% E/ 3.2% MAMD/ |

-continued

| Ex | Airvol 502[a] | Monomer | Initiator | Reaction Type | Product % Solids | Viscosity cP | Tm °C. | Content wt % |
|---|---|---|---|---|---|---|---|---|
| 7 | 1800/ 20% | Ethylene, 1700 psi; VAc | sodium persulfate | thermal, 70° C. | 44.6 | 66,000** | 104.8 | 50.4% PVOH 50% E/ 15% VAc/ 35% PVOH |
| 8 | 803/ 24.9% | Ethylene, 1400 psi | sodium persulfate | thermal, 75° C. | 34 | 3120* | 95 | 92% E/8% PVOH |
| 9 | 1333/ 15% | Ethylene, 1400 psi; VEOVA-10 | ammonium persulfate | thermal, 75° C. | 36 | 254* | 80 | 54% E/ 26% VEOVA-10/ 20% PVOH |

[a]grams/% aqueous solution
*20 rpm; 25° C.
**50 rpm, 25° C.
***100 rpm, 25° C.

The examples show that a variety of poly(vinyl alcohol)-g-polyethylene copolymers can be prepared by varying the reactants and the reaction conditions. The properties of the graft emulsion copolymer can be changed by varying the amount of polyethylene and by adding other comonomers in order to attenuate the polyethylene crystallinity. The data suggest that the graft emulsion copolymers of this invention would be good hot melt or heat seal adhesives, and viscosities are good enough to enable coating at high speeds.

It is anticipated that the graft emulsion copolymers of this invention can be blended with vinyl acetate-ethylene emulsion polymers to enhance heat resistance and adhesion.

What is claimed is:

1. An aqueous based graft emulsion copolymer comprising a polymer containing a plurality of pendent hydroxyl groups and polyethylene wherein said graft emulsion copolymer is formed by graft polymerizing, ethylene and, optionally, an other ethyleneically unsaturated monomer, in an aqueous solution comprising at least 10 wt % of a polymer having a plurality of pendent hydroxyl groups and a degree of polymerization of 50 to 2200, wherein said aqueous based graft emulsion copolymer comprises 50 to 90 wt % polyethylene, 10 to 50 wt % hydroxyl-containing polymer, and 0 to 10 wt % polymerized other ethylenically unsaturated monomer, based on the total weight of graft emulsion copolymer and wherein said polymer containing a plurality of pendent hydroxyl groups is formed by polymerization, and subsequent hydrolysis, of vinyl or acrylic esters in which the ester unit contains from 1 to 4 carbon atoms.

2. The aqueous based graft emulsion copolymer of claim 1, wherein the polymer having a plurality of pendent hydroxyl groups is a poly(vinyl alcohol), said poly(vinyl alcohol) having a degree of hydrolysis of 50 to 100 mol %.

3. The aqueous based graft emulsion copolymer of claim 2 having a solids level of 10 to 65 wt %, wherein the poly(vinyl alcohol) is 85 to 98 mol % hydrolyzed.

4. The aqueous based graft emulsion copolymer of claim 3, wherein the poly(vinyl alcohol) has a degree of polymerization ranging from 100 to 500.

5. The aqueous based graft emulsion copolymer of claim 3, wherein the aqueous solution comprises at least 20 wt % poly(vinyl alcohol) having a degree of polymerization of 100 to 300 and said aqueous based graft emulsion copolymer comprises 50 to 80 wt % polyethylene and 20 to 50 wt % poly(vinyl alcohol).

6. The aqueous based graft emulsion copolymer of claim 3, wherein the other ethylenically unsaturated monomer is selected from the group consisting of a $C_3$ to $C_{12}$ straight chain or branched alkene, a vinyl ester, an alkyl acrylate, an alkyl methacrylate, an hydroxyalkyl acrylate, an hydroxyalkyl methacrylate, an acrylamide, a methacrylamide, and combinations thereof, wherein alkyl is $C_1$ to $C_6$.

7. The aqueous based graft emulsion copolymer of claim 3, wherein the other ethylenically unsaturated monomer is selected from the group consisting of propylene, vinyl acetate, vinyl versatate, acrylamide, N-methylolacrylamide, and combinations thereof.

8. The aqueous based graft emulsion copolymer of claim 3, wherein the solids level is 30 to 60 wt %.

9. The aqueous based graft emulsion copolymer of claim 3, wherein said graft emulsion copolymer consists essentially of 50 to 90 wt % polyethylene and 10 to 50 wt % poly(vinyl alcohol).

10. An aqueous based poly(vinyl alcohol)-grafted-polyethylene emulsion copolymer, wherein the poly(vinyl alcohol)-grafted-polyethylene copolymer is formed by graft polymerizing ethylene, and optionally, an other ethylenically monomer, in an aqueous solution comprising at leat 10 wt % of poly(vinyl alcohol), said poly(vinyl alcohol) having a degree of polymerization of 50 to 2200 and a degree of hydrolysis of 50 to 100 mol %, wherein the aqueous based poly(vinyl alcohol)-grafted-polyethylene emulsion copolymer comprises 50 to 90 wt % polyethylene, 10 to 50 wt % poly(vinyl alcohol), and 0 to 10 wt % polymerized other ethylenically unsaturated monomer, based on the total weight of graft emulsion copolymer.

11. The aqueous based poly(vinyl alcohol)-grafted-polyethylene emulsion copolymer of claim 10 having a solids level of 10 to 65 wt %, wherein the poly(vinyl alcohol) is 85 to 98 mol % hydrolyzed.

12. The aqueous based poly(vinyl alcohol)-grafted-polyethylene emulsion copolymer of claim 11, wherein the poly(vinyl alcohol) has a degree of polymerization ranging from 100 to 500.

13. The aqueous based graft emulsion copolymer of claim 12, wherein the aqueous solution comprises at least 20 wt % poly(vinyl alcohol) having a degree of polymerization of 100 to 300 and said aqueous based graft emulsion copolymer comprises 50 to 80 wt % polyethylene, 20 to 50 wt % poly(vinyl alcohol), and 0 to 5 wt % polymerized other ethylenically unsaturated monomer.

14. The aqueous based poly(vinyl alcohol)-grafted-polyethylene emulsion copolymer of claim 13, wherein the other ethylenically unsaturated monomer is selected from the group consisting of a branched or straight chain $C_3$ to $C_{12}$ alkene, a vinyl ester, an alkyl acrylate, an alkyl methacrylate, an hydroxyalkyl acrylate, an hydroxyalkyl methacrylate, an acrylamide, a methacrylamide, and combinations thereof, wherein alkyl is $C_1$ to $C_6$.

15. The aqueous based poly(vinyl alcohol)-grafted-polyethylene emulsion copolymer of claim 14, wherein the other ethylenically unsaturated monomer is selected from the group consisting of propylene, vinyl acetate, vinyl versatate, acrylamide, N-methylolacrylamide, and mixtures thereof.

16. The aqueous based poly(vinyl alcohol)-grafted-polyethylene emulsion copolymer of claim 15, wherein the solids level is 30 to 60 wt %.

17. The aqueous based poly(vinyl alcohol)-grafted-polyethylene emulsion copolymer of claim 16 consisting essentially of 50 to 80 wt % polyethylene and 20 to 50 wt % poly(vinyl alcohol).

* * * * *

UNITED STATES PATENT AND TRADEMARK OFFICE
CERTIFICATE OF CORRECTION

PATENT NO. : 6,395,817 B2
DATED : May 28, 2002
INVENTOR(S) : John Joseph Rabasco and William Edward Lenney It is certified that error appears in the above-identified patent and that said Letters Patent is hereby corrected as shown below:

<u>Column 10,</u>
Line 44, before the word "monomer," insert the word -- unsaturated --

Signed and Sealed this

Twenty-fourth Day of September, 2002

Attest:

Attesting Officer

JAMES E. ROGAN
*Director of the United States Patent and Trademark Office*